(12) United States Patent
Akamoto et al.

(10) Patent No.: US 9,404,592 B2
(45) Date of Patent: Aug. 2, 2016

(54) DIAPHRAGM VALVE

(71) Applicant: FUJIKIN INCORPORATED, Osaka-shi (JP)

(72) Inventors: Hisatoshi Akamoto, Osaka (JP); Makoto Abe, Osaka (JP); Kunio Ueda, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 0 days.

(21) Appl. No.: 14/399,660

(22) PCT Filed: May 29, 2013

(86) PCT No.: PCT/JP2013/064841
§ 371 (c)(1),
(2) Date: Nov. 7, 2014

(87) PCT Pub. No.: WO2013/180150
PCT Pub. Date: Dec. 5, 2013

(65) Prior Publication Data
US 2015/0115191 A1    Apr. 30, 2015

(30) Foreign Application Priority Data

May 31, 2012   (JP) ................. 2012-123871

(51) Int. Cl.
*F16K 7/00* (2006.01)
*F16K 41/10* (2006.01)
*F16K 17/16* (2006.01)
*F16K 31/122* (2006.01)

(52) U.S. Cl.
CPC . *F16K 7/00* (2013.01); *F16K 17/16* (2013.01); *F16K 31/122* (2013.01); *F16K 41/103* (2013.01)

(58) Field of Classification Search
CPC ..... F16K 31/122; F16K 41/103; F16K 17/16; F16K 7/00
USPC ....................... 251/324, 331, 335.2
See application file for complete search history.

(56) References Cited

U.S. PATENT DOCUMENTS

| 2003/0025099 A1 | 2/2003 | Nakata et al. |
| 2004/0099311 A1 | 5/2004 | Fukano et al. |
| 2010/0140528 A1* | 6/2010 | McLennan ................ F16K 7/16 251/366 |

FOREIGN PATENT DOCUMENTS

| JP | 35-12658 Y1 | 6/1960 |
| JP | 62-80078 U | 5/1987 |

(Continued)

OTHER PUBLICATIONS

International Search Report dated Dec. 3, 2013, issued for PCT/JP2013/064841.

*Primary Examiner* — Marina Tietjen
(74) *Attorney, Agent, or Firm* — Locke Lord LLP; James E. Armstrong, IV; Brian S. Matross

(57) ABSTRACT

A diaphragm valve which can solve problems of a disc-shaped diaphragm, wherein the amount of deformation is significant and dust is liable to be generated, that the change in volume in opening and closing of the fluid channel is significant, and that a pressure receiving surface area of the diaphragm at the time of channel closure is provided. A diaphragm is formed of a synthetic resin and, a cylindrical portion fixedly fitted on a valve rod, a bottom wall portion closing a lower end opening of the cylindrical portion, a flange portion provided at an upper end portion of the cylindrical portion, and a projecting portion provided at a center portion of the bottom wall portion and facing an upper end opening of a fluid inlet passage. A vertical cross-sectional shape of an axially intermediate portion of the cylindrical portion is formed into a substantially arcuate shape projecting radially outward.

2 Claims, 3 Drawing Sheets

(56) References Cited

FOREIGN PATENT DOCUMENTS

| | | |
|---|---|---|
| JP | 3-130474 U | 12/1991 |
| JP | 06-002776 A | 1/1994 |
| JP | 08-326915 A | 12/1996 |
| JP | 10-122415 A | 5/1998 |
| JP | 11-051239 A | 2/1999 |
| JP | 2001-153239 A | 6/2001 |
| JP | 2003-42314 A | 2/2003 |
| JP | 2004-176828 A | 6/2004 |

* cited by examiner

DIAPHRAGM VALVE

TECHNICAL FIELD

The present invention relates to diaphragm valve and, specifically, a diaphragm valve in which a diaphragm formed of synthetic resin such as PTFE is used.

BACKGROUND ART

A diaphragm valve including a body provided with a fluid passage, a seat formed on the body and arranged at a peripheral edge of the fluid passage formed in the body so as to be demountably mountable, a disc-shaped diaphragm configured to open and close the fluid passage by being pressed against and moved away from the seat, and an upward and downward moving means configured to move a diaphragm holder configured to press a center portion of the diaphragm is known (Patent Literature 1 and the like).

Such a diaphragm is configured to seal an opening of an upward-facing depressed portion provided in the body by being fixed to the body at an outer peripheral portion thereof is resiliently deformable (vertically movable) with respect to the outer peripheral portion at a center portion thereof, and contributes to opening and closing of the fluid passage by being resiliently deformed in association with the vertical movement of a valve rod.

The diaphragm is formed, for example, of a nickel alloy thin plate, and is formed into an inverted dish shape by cutting out into a circular shape and causing a center portion thereof to protrude upward. The diaphragm may formed of a stainless steel thin plate, or of a laminated member composed of the stainless steel thin plate and a nickel-cobalt alloy thin plate. A diaphragm formed of PTFE is also known.

CITED REFERENCE

Patent Literature

PTL: JP-A-2003-42314

SUMMARY

Technical Problem

In the diaphragm valve of the related art described above, since a disc shaped portion of the diaphragm is deformed entirely, there are problems that the amount of deformation is significant and dust is liable to be generated, and there is also a problem that a change in volume in association with opening and closing of the fluid passage is significant, and there is further a problem that a pressure receiving surface area of the diaphragm at the time of passage closure is large.

It is an object of the present invention is to provide a diaphragm valve which can solve problems of the disc-shaped diaphragm, in other words, the problems that the amount of deformation is significant and dust is liable to be generated, that the change in volume in association with opening and closing of the fluid passage is significant, and that the pressure receiving surface area of the diaphragm at the time of passage closure is large.

Solution to Problem

A diaphragm valve according of the present invention including: a body provided with a fluid passage; a casing provided above the body; a diaphragm configured to open and close the fluid passage; and a valve rod configured to move the diaphragm in a closing or opening direction by moving upward or downward, is characterized in that the diaphragm is formed of a synthetic resin made, and includes: a cylindrical portion fixedly fitted on the valve rod; a bottom wall portion that closes a lower end opening of the cylindrical portion; a flange portion provided on an upper end portion of the cylindrical portion; and a projecting portion provided on a center portion of the bottom wall portion and facing toward an upper end opening of the fluid passage, and in that a vertical cross-sectional shape of an axially intermediate portion of the cylindrical portion is formed into a substantially arcuate shape projecting radially outward.

The diaphragm does not have a disc shape as that of the related art, and has a bottomed substantially cylindrical shape including a cylindrical portion having a flange portion and a bottom portion provided with a projecting portion. Then, with the cylindrical portion having the vertical cross-sectional shape of the substantially arcuate shape projecting radially outward at the axially intermediate portion, the axially intermediate portion of the cylindrical portion can be resiliently deformed (deformed by compression) easily in an axial direction.

Accordingly, a closed state in which the projecting portion of the diaphragm closes the upper end opening of the fluid passage and an opened state in which the cylindrical portion is deformed by compression and the projecting portion of the diaphragm is apart from the upper end opening of the fluid passage are obtained. Here, the deformation of the cylindrical portion is a deformation in a state in which the cylindrical shape is maintained, and hence the projecting portion which closes the opening of the fluid passage is not deformed. Therefore, the degree of deformation may be smaller than that of the disc-shaped diaphragm which is deformed at the center portion thereof. Accordingly, the problems of the disc-shaped diaphragm that the amount of deformation is significant and dust is liable to be generated, that the change in volume in association with opening and closing of the fluid passage is significant, and that the pressure receiving surface area of the diaphragm at the time of passage closure is large may be solved.

The diaphragm may be obtained as a synthetic resin made molding product formed by using a metal die or a processed product formed by machining. The synthetic resin is not specifically limited. However, fluorine contained resins such as ethylene tetrafluoride resin (PTFE) and the like having a high drug-resistance and a high corrosion resistance is suitable. By making the diaphragm of such a synthetic resin, the corrosion resistance can be improved in comparison with a metallic diaphragm. Examples of fluorine contained resin other than PTFE include tetrafluoroethylene/perfluoroalkylvinylether copolymers (PFA), tetrafluoroethylene-hexafluoropropylene-copolymer (FEP), ethylene tetrafluoroethylene (ETFE), polyvinylidene fluoride resin (PVDF) and the like.

Preferably, the cylindrical portion of the diaphragm is provided with a female screw portion on an lower inner periphery thereof, and the diaphragm is attached to the valve rod by the female screw portion screwed into a male screw portion provided on an outer periphery of the valve rod, and the axially intermediate portion of the cylindrical portion is thinner than the lower portion of the cylindrical portion.

In this configuration, the movement of the diaphragm in association with the movement of the rod is ensured, and the amount of resilient deformation of the cylindrical portion of the diaphragm at the axially intermediate portion may be increased.

Preferably, the casing is provided with a cylindrical guide portion configured to guide the valve rod and receive the flange portion of the diaphragm moved upward, and a resilient member is interposed between a lower end surface of the cylindrical guide portion and an upper surface of the flange portion of the diaphragm.

In this configuration, since the cylindrical guide portion configured to guide the valve rod also has a function to receive the flange portion of the diaphragm, the structure is simplified and, since the resilient member is interposed between the lower end surface of the cylindrical guide portion and the upper surface of the flange portion of the diaphragm, the synthetic resin made diaphragm is prevented from becoming damaged.

The diaphragm valve may have the upward and downward moving means, which is a manually operated valve such as an opening-closing handle, or may be an automatic valve having a suitable actuator as the upward and downward moving means. The actuator in the case of the automatic valve may be operated by fluid (air) pressure or by an electromagnetic force.

In this specification, a direction of movement of the valve rod (an axial direction of the diaphragm) is defined as an upward and downward direction. However, this direction is defined only for the convenience and, in the actual mounting, the upward and downward direction may not only be a perpendicular direction, but also be a horizontal direction.

Advantageous Effects of Invention

According to the diaphragm valve of the present invention, the problems of the disc-shaped diaphragm that the amount of deformation is significant and dust is liable to be generated, that the change in volume in association with opening and closing of the fluid passage is significant, and that the pressure receiving surface area of the diaphragm at the time of passage closure is large may be solved.

REFERENCE SIGNS LIST (1): diaphragm valve, (2): body, (2a): fluid inlet passage, (2b): fluid outlet passage, (4) valve rod, (5): diaphragm, (10): disc spring (resilient member), (21): cylindrical portion, (22): bottom wall portion, (23): flange portion, (24): projecting portion, (31): upper portion, (32): lower portion, (32a): female screw portion, (33): intermediate portion (axially intermediate portion), (34a): male screw portion, (37); cylindrical guide portion

DESCRIPTION OF EMBODIMENT

An embodiment of the present invention will be described with reference to the drawings, in the following description given below, up, down, left and right indicate up, down, left and right in FIG. 1.

Figure 1:
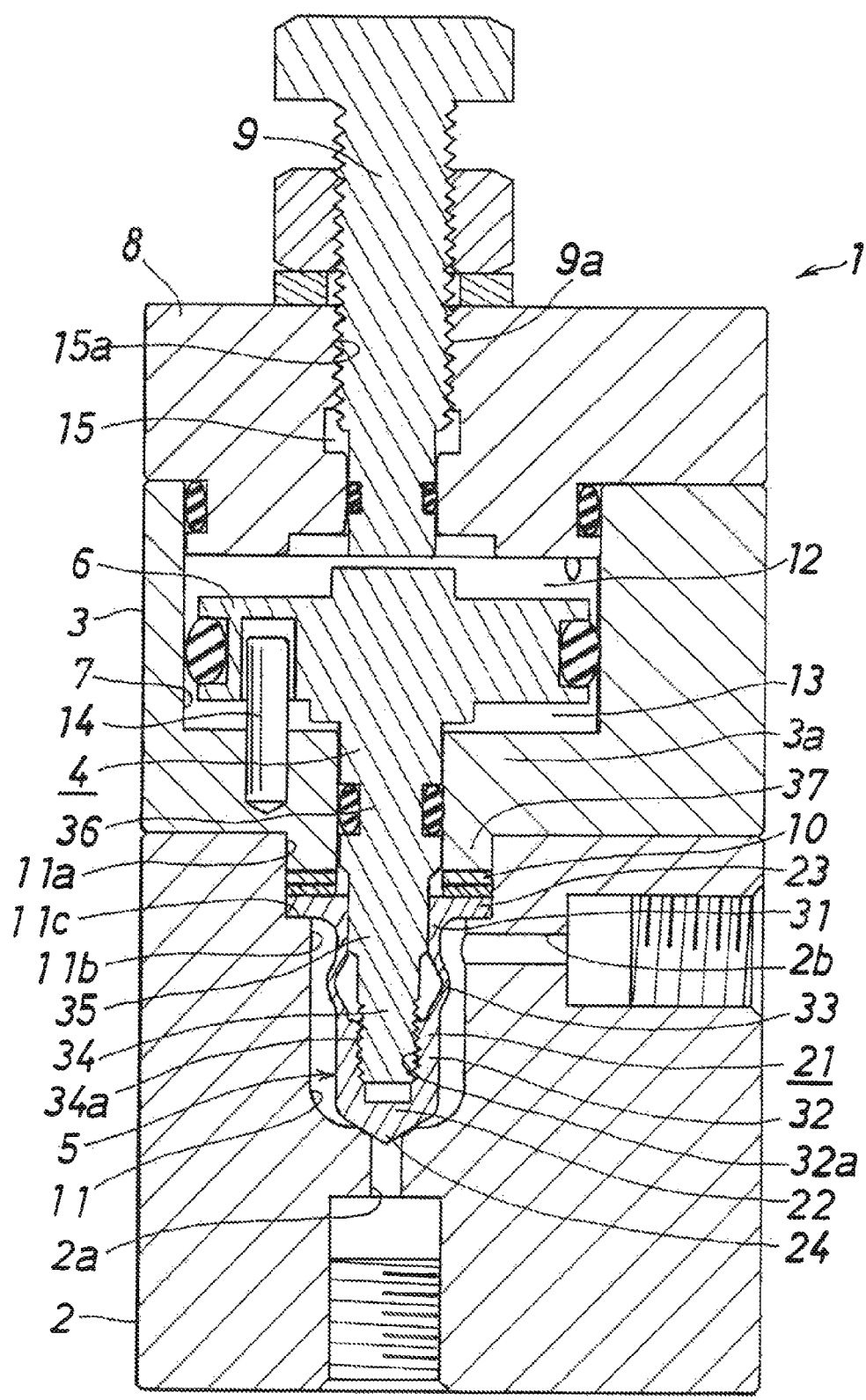
FIG. 1 is a vertical cross-sectional view illustrating a first embodiment of a diaphragm valve of the present invention.

FIG. 1 illustrates a first embodiment of a diaphragm valve according to the present invention, and a diaphragm valve (1) includes a body (2), a casing (3) mounted above the body (2), a valve rod (4) arranged in the casing (3) so as to be movable in the vertical direction, a diaphragm (5) fixedly fitted to a lower portion of the valve rod (4), a piston (6) provided integrally with the valve rod (4) at an upper end portion of the valve rod (4), a cylinder chamber (7) provided on an upper portion of the casing (3) and configured to store the piston (6) so as to be movable in the vertical direction, a cap (8) configured to close an upper end opening of the casing (3), and an adjuster (9) configured to penetrate through a center portion of the cap (8).

The body (2) is provided with a depressed portion (11) opening upward. The upper end opening of a fluid inlet passage (2a) opening at a lower end communicates with a bottom surface of the depressed portion (11), and a left end of a fluid outlet passage (2b) opening at a right end continuing to a right side surface of the depressed portion (11). The depressed portion (11) of the body (2) includes a large diameter portion (11a) on an upper side, and a small diameter portion (11b) provided on the lower side and communicating with the large diameter portion (11a) via a shoulder surface (11c).

Figure 2:
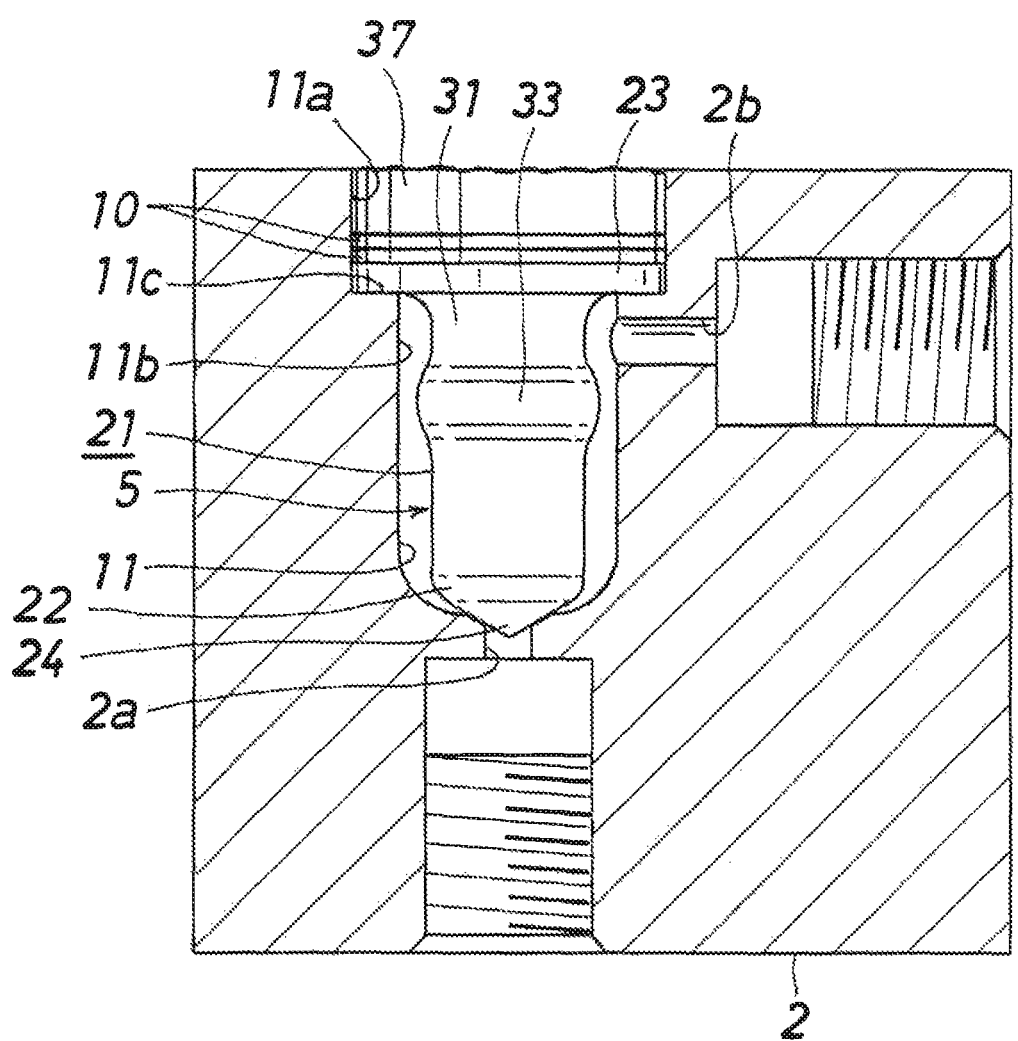
FIG. 2 is a drawing illustrating an outer peripheral surface of the diaphragm in an enlarged scale, and illustrates a state in which a fluid passage is closed.
Figure 3:
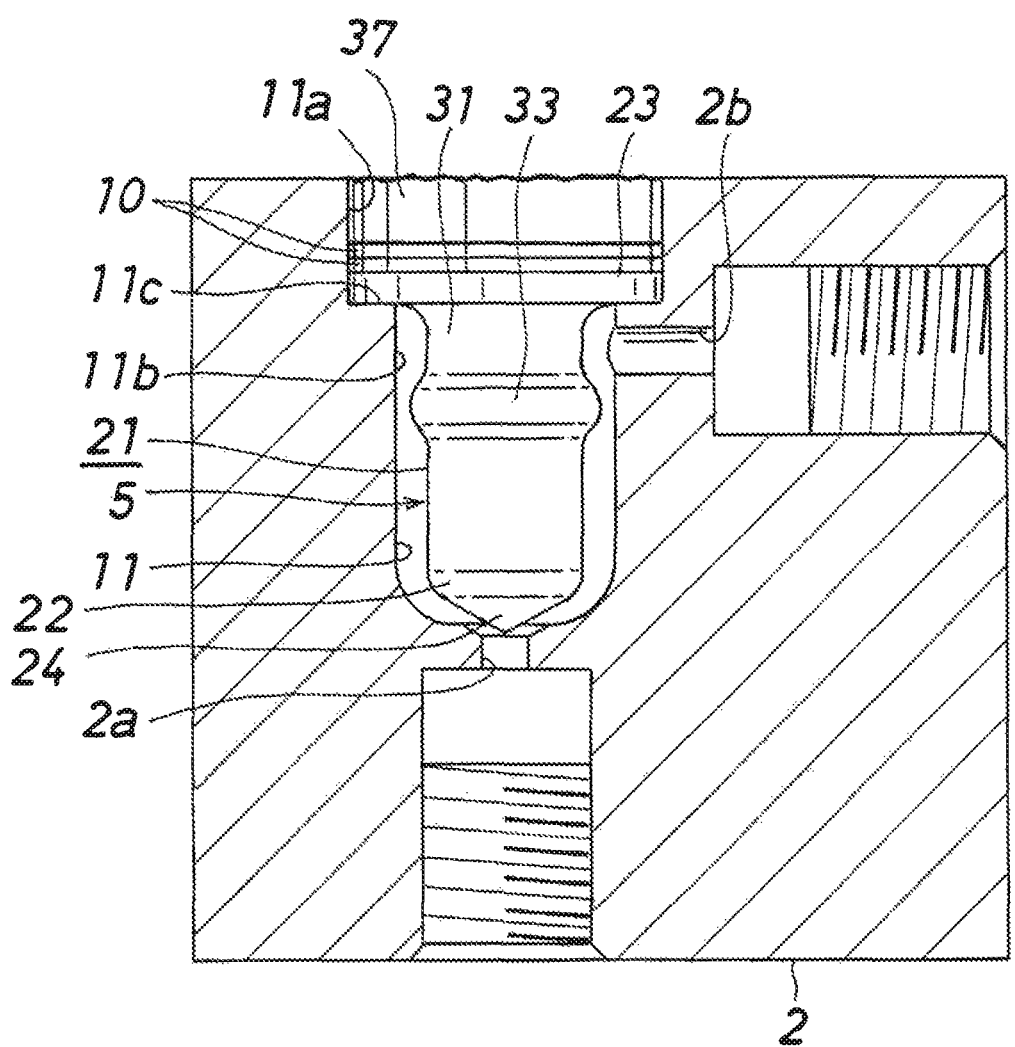
FIG. 3 is a drawing illustrating the outer peripheral surface of the diaphragm in an enlarged scale, and illustrates a state in which the fluid passage is opened.

The diaphragm (5) is formed of a synthetic resin and, as illustrated also in FIG. 2 and FIG. 3, the cylindrical portion (21) fixedly fitted on the valve rod (4), a bottom wall portion (22) closing a lower end opening of the cylindrical portion (21), an outward flange portion (23) provided at the other end portion of the cylindrical portion (21), and a conical projecting portion (24) provided at a center portion of the bottom wall portion (22) and facing the upper end opening of the fluid inlet passage (2a).

The cylindrical portion (21) of the diaphragm (5) includes a cylindrical upper portion (31) continuing to the lower side of the outward flange portion (23), a cylindrical lower portion (32) continuing to an upper side of the bottom wall portion (22) and an intermediate portion (33) provided between the upper portion (31) and the lower portion (32). The intermediate portion (33) has a vertical cross-section having a projecting arcuate shape. The upper portion (31) and the lower portion (32) are fitted to the valve rod (4), and an inner peripheral surface of the intermediate portion (33) is out of contact with an outer peripheral surface of the valve rod (4). The lower portion (32) is formed to be thicker than the upper portion (31) and the intermediate portion (33).

The valve rod (4) includes a small diameter portion (34) on a distal end side, an intermediate diameter portion (35) continuing to an upper side of the small diameter portion (34), and a large diameter portion (36) continuing to an upper side of the intermediate diameter portion (35). The piston (6) is integrally provided near an upper end of the large diameter portion (36). The large diameter portion (36) is inserted into a cylindrical guide portion (37) provided in the casing (3) so as to be movable in the vertical direction. A male screw portion (34a) is formed on an outer periphery of the small diameter portion (34).

A lower end portion of the cylindrical guide portion (37) projects downward with respect to a bottom surface of a bottom wall (3a) of the casing (3), and is configured to receive an upper surface of the outward flange portion (23) of the diaphragm (5) by the lower end surface thereof. Two disc springs (resilient members) (10) are interposed between the lower end surface of the cylindrical guide portion (37) and the upper surface of the outward flange portion (23) of the diaphragm (5). The outward flange portion (23) of the diaphragm (5) and a plurality of (two in this case) disc springs (10) are nipped between the lower end surface of the cylindrical guide portion (37) and the shoulder surface (11c) of the depressed portion (11) of the body (2), and the vertical movement thereof is disabled.

The upper portion (31) of the cylindrical portion (21) of the diaphragm (5) is fitted to the intermediate diameter portion (35) of the valve rod (4). This fitting allows a relative vertical movement between the upper portion (31) of the cylindrical portion (21) and the intermediate diameter portion of the valve rod (4). The female screw portion (32a) is provided on an inner periphery of the lower portion (32) of the cylindrical portion (21) of the diaphragm (5), and the diaphragm (5) is attached to the valve rod (4) by the female screw portion (32a) of the lower portion (32) of the cylindrical portion (21) being screwed with the male screw portion (34a) of the small diameter portion (34) of the valve rod (4). The intermediate portion (33) has a vertical cross-section having a projecting arcuate shape, and is out of contact with the outer peripheral surface of the valve rod (4), and hence is allowed to be resiliently deformed (deformed by compression) when the lower portion (32) of the cylindrical portion (21) is moved toward the upper portion (31) of the cylindrical portion (21).

In the interior of the cylinder chamber (7), an operation air introduction chamber (12) on an upper side of the piston (6), and an operation air introduction chamber (13) on a lower side of the piston (6) are formed. By introducing operation air into the operation air introduction chamber (12) on the upper side, the valve rod (4) can be moved downward, while by introducing the operation air into the operation air introduction chamber (13) on the lower side, the valve rod (4) can be moved upward. A pin (14) configured to guide the vertical movement of the piston (6) is provided upright on the bottom wall (3a) of the casing (3).

A through hole (15) is provided at a center portion of the cap (8), and a female screw portion (15a) is provided on an upper portion of the through hole (15). A male screw portion (9a) provided on an outer periphery of the adjuster (9) is screwed with the female screw portion (15a) of the through hole (15). In this configuration, by moving the adjuster (9) downward, the upward movement of the valve rod (4) can be restricted.

As illustrated in FIG. 1 and FIG. 2, in a state in which the valve rod (4) is moved downward, a closed state in which the projecting portion (24) of the diaphragm (5) closes the upper end opening of the fluid inlet passage (2a) is achieved.

Then, in the state in which the valve rod (4) is moved upward, an opened state in which the projecting portion (24) of the diaphragm (5) is apart from the upper end opening of the fluid inlet passage (2a) is achieved as illustrated in FIG. 3. In the opened state, the valve rod (4) is movable upward until abutting against the adjuster (9), and the female screw portion (32a) of the lower portion (32) of the cylindrical portion (21) is screwed with the male screw portion (34a) of the small diameter portion (34) of the valve rod (4), so that the diaphragm (5) makes an attempt to move upward integrally with the valve rod (4). Here, since the outward flange portion (23) of the diaphragm (5) is nipped between the lower end surface of the cylindrical guide portion (37) and the shoulder surface (11c) of the depressed portion (11) of the body (2), the vertical movement thereof is disabled. In other words, the upper portion (31) of the cylindrical portion (21) of the diaphragm (5) is not changed in position from the state illustrated in FIG. 2, and only the cylindrical lower portion (32) moves upward and, in association with this movement, the intermediate portion (33) having a vertical cross-section having a projecting arcuate shape provided between the upper portion (31) and the lower portion (32) is resiliently deformed.

As is apparent from the comparison between FIG. 2 and FIG. 3, the amount of deformation of the diaphragm (5) is very small. The diameter of the diaphragm (5) is smaller than that of the disc-shaped diaphragm of the related art, a volumetric change can be set to be smaller than that of the disc-shaped diaphragm even though strokes (the amount of deformation in the axial direction) are the same, the problems that the amount of deformation is significant and dust is liable to be generated, that the change in volume in association with opening and closing of the fluid passage is significant may be solved. Since the amount of deformation is small, the durability of the diaphragm (5) is also improved. The conical projecting portion (24) of the diaphragm (5) has a function as a valve element, and this part may be small so that the pressure receiving surface area at the time of passage closure may be reduced to reduce a probability of being influenced by the fluid pressure. Accordingly, an output of the actuator for achieving the closed state (a pressure of operation air or the like) may be reduced.

In the description given above, the actuator to use the operation air is illustrated. However, the diaphragm valve may be a manual valve configured to move the vale rod upward and downward by an opening and closing handle instead of the automatic valve as described above, and in the case of the automatic valve, it may be on the basis of a fluid (air) pressure and may be of an electromagnetic force. When using the operation air, it is not limited to the embodiment described above.

INDUSTRIAL APPLICABILITY

According to the present invention, the problems of the diaphragm valve in which the disc-shaped diaphragm of the related art is used may be solved, and the diaphragm valve with improved performance is provided.

The invention claimed is:
1. A diaphragm valve comprising:
    a body provided with a fluid passage;
    a casing provided above the body;
    a diaphragm configured to open and close the fluid passage; and
    a valve rod configured to move the diaphragm in a closing or opening direction by moving upward or downward, characterized in that
    the diaphragm is formed of a synthetic resin made, and includes:
        a cylindrical portion fixedly fitted on the valve rod;
        a bottom wall portion that closes a lower end opening of the cylindrical portion;
        a flange portion provided on an upper end portion of the cylindrical portion; and
        a projecting portion provided on a center portion of the bottom wall portion and facing toward an upper end opening of the fluid passage, and in that
        a vertical cross-sectional shape of an axially intermediate portion of the cylindrical portion is formed into a substantially arcuate shape projecting radially outward,
        wherein the casing is provided with a cylindrical guide portion configured to guide the valve rod and receive the flange portion of the diaphragm moved upward, and a disc spring is interposed between a lower end surface of the cylindrical guide portion and an upper surface of the flange portion of the diaphragm.
2. The diaphragm valve according to claim 1, wherein the cylindrical portion of the diaphragm is provided with a female screw portion on an lower inner periphery thereof, and the diaphragm is attached to the valve rod by the female screw portion screwed into a male screw portion provided on an outer periphery of the valve rod, and the axially intermediate portion of the cylindrical portion is thinner than a lower portion of the cylindrical portion.

* * * * *